(12) United States Patent
Diamond et al.

(10) Patent No.: US 8,751,825 B1
(45) Date of Patent: Jun. 10, 2014

(54) CONTENT SERVER AND METHOD OF STORING CONTENT

(75) Inventors: Michael B. Diamond, Los Gatos, CA (US); Jonathan B. White, Fort Collins, CO (US)

(73) Assignee: Nvidia Corporation, Santa Clara, CA (US)

( * ) Notice: Subject to any disclaimer, the term of this patent is extended or adjusted under 35 U.S.C. 154(b) by 1026 days.

(21) Appl. No.: 11/013,745

(22) Filed: Dec. 15, 2004

(51) Int. Cl.
*H04L 29/06* (2006.01)

(52) U.S. Cl.
USPC ........... 713/193; 713/189; 380/201; 380/228; 380/230; 380/232

(58) Field of Classification Search
USPC .......... 713/193, 189; 380/201, 228, 230, 232; 705/2
See application file for complete search history.

(56) References Cited

U.S. PATENT DOCUMENTS

| | | | |
|---|---|---|---|
| 5,237,616 A | 8/1993 | Abraham et al. | |
| 5,552,897 A | 9/1996 | Mandelbaum et al. | |
| 5,623,546 A | 4/1997 | Hardy et al. | |
| 5,629,980 A | 5/1997 | Stefik et al. | |
| 5,721,829 A | 2/1998 | Dunn et al. | |
| 5,757,911 A | 5/1998 | Shibata | |
| 5,857,020 A | 1/1999 | Peterson, Jr. | |
| 5,861,906 A | 1/1999 | Dunn et al. | |
| 5,880,733 A | 3/1999 | Horvitz et al. | |
| 5,973,680 A | 10/1999 | Ueda | |
| 6,005,636 A | 12/1999 | Westerman | |
| 6,016,348 A | 1/2000 | Blatter et al. | |
| 6,028,585 A | 2/2000 | Ishii et al. | |
| 6,069,647 A | 5/2000 | Sullivan et al. | |
| 6,115,819 A | 9/2000 | Anderson | |
| 6,141,754 A | 10/2000 | Choy | |
| 6,298,445 B1 | 10/2001 | Shostack et al. | |
| 6,314,409 B2 | 11/2001 | Schneck et al. | |
| 6,367,019 B1 | 4/2002 | Ansell et al. | |
| 6,389,538 B1 * | 5/2002 | Gruse et al. | 713/194 |
| 6,389,541 B1 | 5/2002 | Patterson | |
| 6,398,245 B1 | 6/2002 | Gruse et al. | |
| 6,547,829 B1 | 4/2003 | Meyerzon et al. | |
| 6,550,011 B1 * | 4/2003 | Sims, III | 713/193 |
| 6,580,916 B1 | 6/2003 | Weisshaar et al. | |
| 6,597,380 B1 | 7/2003 | Wang et al. | |
| 6,615,192 B1 * | 9/2003 | Tagawa et al. | 705/57 |
| 6,622,148 B1 | 9/2003 | Noble et al. | |

(Continued)

FOREIGN PATENT DOCUMENTS

WO  01/93000  12/2011

OTHER PUBLICATIONS

Microsoft Corporation, "A Technical Overview of Windows Media DRM 10 for Device", pp. 1-20, Retrieved from http://download.microsoft.com/download/b/7/a/b7a9aeae-d9f2-435b-a2dc-f3b0909d1d62/A_Technical_Overview_of_WM_DRM_10_for_Devices.doc.*

(Continued)

*Primary Examiner* — Chau Le

(57) ABSTRACT

A method of storing content, in accordance with one embodiment of the present invention, includes receiving an item of content in a protected format and a key corresponding to the item of content. The item of content in its protected format may be stored on a mass storage device. The key may also be stored in a safeguarded format on the mass storage device.

20 Claims, 4 Drawing Sheets

(56) References Cited

U.S. PATENT DOCUMENTS

| | | | |
|---|---|---|---|
| 6,651,171 B1 | 11/2003 | England et al. | |
| 6,697,948 B1 | 2/2004 | Rabin et al. | |
| 6,708,161 B2 | 3/2004 | Tenorio et al. | |
| 6,742,116 B1 | 5/2004 | Matsui et al. | |
| 6,748,537 B2 | 6/2004 | Hughes | |
| 6,772,335 B2 | 8/2004 | Curtis et al. | |
| 6,785,820 B1 | 8/2004 | Muttik et al. | |
| 6,788,800 B1 | 9/2004 | Carr et al. | |
| 6,801,999 B1 | 10/2004 | Venkatesan et al. | |
| 6,807,534 B1 | 10/2004 | Erickson | |
| 6,832,319 B1* | 12/2004 | Bell et al. | 713/193 |
| 6,865,555 B2 | 3/2005 | Novak | |
| 6,891,953 B1 | 5/2005 | DeMello et al. | |
| 6,922,740 B2 | 7/2005 | Kondratiev et al. | |
| 6,948,073 B2 | 9/2005 | England et al. | |
| 6,957,343 B2* | 10/2005 | Ripley et al. | 713/193 |
| 6,980,652 B1 | 12/2005 | Braitberg et al. | |
| 6,990,513 B2 | 1/2006 | Belfiore et al. | |
| 7,003,675 B2 | 2/2006 | Benaloh | |
| 7,010,808 B1 | 3/2006 | Leung et al. | |
| 7,020,688 B2 | 3/2006 | Sykes, Jr. | |
| 7,035,827 B2* | 4/2006 | Ezaki | 705/51 |
| 7,036,020 B2 | 4/2006 | Thibadeau | |
| 7,047,411 B1 | 5/2006 | DeMello et al. | |
| 7,065,216 B1 | 6/2006 | Benaloh et al. | |
| 7,065,506 B1 | 6/2006 | Phillipo et al. | |
| 7,065,651 B2 | 6/2006 | Evans | |
| 7,069,449 B2* | 6/2006 | Weaver, III et al. | 713/193 |
| 7,073,071 B1 | 7/2006 | Ellison et al. | |
| 7,093,298 B2 | 8/2006 | Rodriquez et al. | |
| 7,095,853 B2* | 8/2006 | Morishita | 380/201 |
| 7,107,462 B2* | 9/2006 | Fransdonk | 713/193 |
| 7,111,169 B2* | 9/2006 | Ripley et al. | 713/176 |
| 7,120,250 B2* | 10/2006 | Candelore | 380/200 |
| 7,120,868 B2 | 10/2006 | Salesin et al. | |
| 7,131,144 B2 | 10/2006 | Rabin et al. | |
| 7,139,811 B2 | 11/2006 | Lev Ran et al. | |
| 7,145,492 B2 | 12/2006 | Hirano et al. | |
| 7,150,031 B1 | 12/2006 | Rodriguez et al. | |
| 7,152,047 B1* | 12/2006 | Nagel | 705/76 |
| 7,155,733 B2 | 12/2006 | Rodriguez et al. | |
| 7,159,120 B2 | 1/2007 | Muratov et al. | |
| 7,181,016 B2 | 2/2007 | Cross et al. | |
| 7,191,153 B1 | 3/2007 | Braitberg et al. | |
| 7,197,648 B2 | 3/2007 | Evans | |
| 7,200,593 B2 | 4/2007 | Shimomura et al. | |
| 7,225,333 B2 | 5/2007 | Peinado et al. | |
| 7,225,340 B2* | 5/2007 | Asahi et al. | 713/193 |
| 7,228,427 B2 | 6/2007 | Fransdonk | |
| 7,242,771 B2* | 7/2007 | Shiragami et al. | 380/200 |
| 7,299,209 B2 | 11/2007 | Collier | |
| 7,340,056 B2* | 3/2008 | Morcel | 380/239 |
| 7,353,543 B2* | 4/2008 | Ohmori et al. | 726/29 |
| 7,370,205 B2 | 5/2008 | Ogino | |
| 7,370,364 B2 | 5/2008 | Dobbins et al. | |
| 7,376,624 B2* | 5/2008 | Cochran et al. | 705/53 |
| 7,383,205 B1 | 6/2008 | Peinado et al. | |
| 7,395,333 B1 | 7/2008 | Saulpaugh et al. | |
| 7,395,438 B2* | 7/2008 | Parks et al. | 713/194 |
| 7,421,128 B2 | 9/2008 | Venkatesan et al. | |
| 7,536,386 B2 | 5/2009 | Samji et al. | |
| 7,543,160 B2 | 6/2009 | Adams et al. | |
| 7,549,044 B2 | 6/2009 | Lee et al. | |
| 7,606,818 B2 | 10/2009 | Bachmann et al. | |
| 7,606,918 B2 | 10/2009 | Holzman et al. | |
| 7,607,024 B2 | 10/2009 | Staring et al. | |
| 7,644,446 B2* | 1/2010 | Strom et al. | 726/32 |
| 7,689,510 B2 | 3/2010 | Lamkin et al. | |
| 7,716,487 B2 | 5/2010 | Venkatesan et al. | |
| 7,933,409 B2* | 4/2011 | Yamamoto et al. | 380/201 |
| 8,055,910 B2 | 11/2011 | Kocher et al. | |
| 8,359,332 B1 | 1/2013 | Diamond et al. | |
| 8,402,283 B1 | 3/2013 | Diamond et al. | |
| 2001/0020274 A1 | 9/2001 | Shambroom | |
| 2001/0021926 A1 | 9/2001 | Schneck et al. | |
| 2002/0002468 A1* | 1/2002 | Spagna et al. | 705/1 |
| 2002/0012432 A1 | 1/2002 | England et al. | |
| 2002/0077986 A1 | 6/2002 | Kobata et al. | |
| 2002/0077992 A1* | 6/2002 | Tobin | 705/65 |
| 2002/0099663 A1 | 7/2002 | Yoshino et al. | |
| 2002/0186844 A1 | 12/2002 | Levy et al. | |
| 2003/0016842 A1 | 1/2003 | Patton et al. | |
| 2003/0061477 A1* | 3/2003 | Kahn et al. | 713/150 |
| 2003/0070169 A1 | 4/2003 | Beyers, II et al. | |
| 2003/0097655 A1 | 5/2003 | Novak | |
| 2003/0108199 A1* | 6/2003 | Pinder et al. | 380/200 |
| 2003/0140228 A1 | 7/2003 | Binder | |
| 2003/0149989 A1 | 8/2003 | Hunter et al. | |
| 2003/0152364 A1* | 8/2003 | Wajs | 386/68 |
| 2003/0161473 A1 | 8/2003 | Fransdonk | |
| 2003/0164856 A1 | 9/2003 | Prager et al. | |
| 2003/0177093 A1 | 9/2003 | Hirano et al. | |
| 2003/0215091 A1* | 11/2003 | Kambayashi et al. | 380/201 |
| 2003/0225796 A1 | 12/2003 | Matsubara | |
| 2003/0229845 A1 | 12/2003 | Salesin et al. | |
| 2004/0012573 A1 | 1/2004 | Morrison et al. | |
| 2004/0015426 A1 | 1/2004 | Tadayon et al. | |
| 2004/0025033 A1 | 2/2004 | Todd | |
| 2004/0049395 A1 | 3/2004 | Gaya | |
| 2004/0083366 A1 | 4/2004 | Nachenberg et al. | |
| 2004/0133794 A1* | 7/2004 | Kocher et al. | 713/193 |
| 2004/0133803 A1* | 7/2004 | Rabin et al. | 713/200 |
| 2004/0139396 A1 | 7/2004 | Gelernter et al. | |
| 2004/0148523 A1 | 7/2004 | Lambert | |
| 2004/0193902 A1 | 9/2004 | Vogler et al. | |
| 2005/0008130 A1 | 1/2005 | Wakamatsu | |
| 2005/0025312 A1 | 2/2005 | Rijkaert et al. | |
| 2005/0058291 A1 | 3/2005 | Candelore | |
| 2005/0086478 A1* | 4/2005 | Peinado et al. | 713/171 |
| 2005/0091511 A1 | 4/2005 | Nave et al. | |
| 2005/0111663 A1* | 5/2005 | Lotspiech et al. | 380/239 |
| 2005/0119967 A1 | 6/2005 | Ishiguro et al. | |
| 2005/0132179 A1 | 6/2005 | Glaum et al. | |
| 2005/0265193 A1 | 12/2005 | Phillipo et al. | |
| 2005/0289076 A1 | 12/2005 | Lambert | |
| 2006/0005257 A1* | 1/2006 | Tohru et al. | 726/27 |
| 2006/0064605 A1 | 3/2006 | Giobbi | |
| 2006/0149567 A1 | 7/2006 | Muller et al. | |
| 2006/0190621 A1* | 8/2006 | Kamperman et al. | 709/245 |
| 2006/0224902 A1 | 10/2006 | Bolt | |
| 2007/0033419 A1* | 2/2007 | Kocher et al. | 713/193 |
| 2007/0192111 A1 | 8/2007 | Chasen | |
| 2007/0208992 A1 | 9/2007 | Koren | |
| 2008/0148063 A1* | 6/2008 | Hanko et al. | 713/189 |
| 2008/0178081 A1 | 7/2008 | Reshef et al. | |
| 2009/0327031 A1 | 12/2009 | Jain | |

OTHER PUBLICATIONS

SearchSecurity.com, Content Scrambling System (CSS), May 2000, Retrieved from http://searchsecurity.techtarget.com/definition/Content-Scrambling-System?vgnextfmt=print.*

Blaze, A Cryptographic File System for Unix, 1993, ACM, Computer and Communication Security Nov. 1993, pp. 9-16.

CyberLink PowerCinema Linux Featuring Instant-On Capability Enables Digital Home Entertainment for CE and PC; Press Release on Oct. 26, 2004; http://www.cyberlink.com/eng/press_room/view_747.html.

Felton, E. W. 2003. A Skeptical View of DRM and Fair Use. Commun. ACM 46, 4 (Apr. 2003) 56-59.

Licenses for your media files are corrupted, Microsoft, Aug. 21, 2007.

Secure Video Processor Challenge—Response Protocol Top-Level Description, SVPLA, Apr. 15, 2004, 8 pages.

SVP Open Content Protection System Technical Overview, SVPLA, Jan. 3, 2005, 51 pages.

U.S. Appl. No. 10/910,452, filed Aug. 2, 2004; Title: Secure content enabled drive digital rights management system and method.

U.S. Appl. No. 11/202,545, filed Aug. 11, 2005; Title: Method and System for Accessing Content on Demand.

U.S. Appl. No. 11/014,001, filed Dec. 15, 2004; Title: Content Server and Method of Providing Content Therefrom.

U.S. Appl. No. 11/112,364, filed Apr. 22, 2005; Title: Content Keys for Authorizing Access to Content.

(56) References Cited

OTHER PUBLICATIONS

U.S. Appl. No. 11/193,051, filed Jul. 29, 2005; Title: User Interface for Presentation of Content.
U.S. Appl. No. 11/202,844, filed Aug. 11, 2005; Title: Method and System for Registering and Activating Content.

Halderman, J. Alex and Edward W. Felten, "Lessons from the Sony CD DRM episode." Proceedings of the 15th USENIX Security Symposium. vol. 15. No. 1. 2006.
"Hardware Module Design for Ensuring Trust" 2010 IEEE Annual Symposium on VLSI, Apostolos P. Fournaris.

* cited by examiner

CONTENT SERVER AND METHOD OF STORING CONTENT

BACKGROUND OF THE INVENTION

Electronic systems are often utilized to present any of a vast array of content to a user. The convenience of having content more readily accessible typically results in the user accessing the content more often and may also result in the user acquiring ever-increasing amounts of content. Accordingly, content servers have advantageously been utilized to make content more readily accessible to users.

A content server typically provides for loading content onto a mass storage device and presenting the content stored thereon. Referring to FIG. 1, a flow diagram of steps of a method of storing content on a content server according to the conventional art is shown. As depicted in FIG. 1, the method of storing content begins with receiving content, at 110. For example, a user may insert a DVD containing a movie or a CD containing music in the CD/DVD drive of the content server. The content may be received in a protected format, such as content scrambling system (CSS) encryption or the like. If the received content is encoded in a protected format, the protection is removed from the content, at 120. For example, a disk key contained on the DVD or CD may be used to decrypt the CSS encoded music or movie. The unprotected content is then stored on a mass storage device, such as a hard disk drive, at 130.

Referring now to FIG. 2, a flow diagram of steps of a method of presenting the content stored on the content server according to the conventional art is shown. As depicted in FIG. 2, the method of presenting content begins with receiving a request for a particular item of content, at 210. At 220, the requested content is presented on an appropriate output device to the user.

Traditional systems for communicating and storing content often make copying of proprietary content relatively easy. For example, it is not uncommon for a user of the above-described content server to rent movies and/or music on DVDs and/or CDs and load them onto their system. The user may then return the DVDs or CDs, and yet continue to illegally watch the movies and/or listen to the music after the rental period has expired. Similarly, a user may borrow movies and/or music from others and load them onto their content server. The user may then return the DVD or CD to the person that they borrowed it from, and yet continue to illegally watch the movies and/or listen to the music thereafter. Accordingly, conventional content servers readily enable rent-and-rip, borrow-and-rip and the like.

However, creators and/or distributors of proprietary content (e.g., movies, music, etc.) have an economic interest in the content and desire to restrict the copying and/or distribution of the proprietary content to individuals that have purchased or rented the content in accordance with the nature of the user's ownership. Thus, content servers according to the conventional art are problematic in that the interests of the creators and/or distributors of proprietary content are not protected.

SUMMARY OF THE INVENTION

Accordingly, embodiments of the present invention are directed toward a system and method of serving content. In one embodiment, a content server includes a content input device, a mass storage device and a processing unit communicatively coupled between the content input device and the mass storage device. The processing unit implements a content storage module for receiving an item of content via the content input device. The particular item of content may be encrypted. The content storage module may also receive one or more keys corresponding to the item of content. If the item of content is in a protected format, the content storage module stores the content in its protected format on the mass storage device. The content storage module may also store the one or more keys associated with the item of content in a safeguarded format on the mass storage device.

In another embodiment, a method of storing content includes receiving an item of content in a protected format and a key corresponding to the item of content. The item of content may be stored on a mass storage device in its protected format. The key may also be stored in a safeguarded format on the mass storage device.

Embodiments of the present invention advantageously prevent extraction of the content back off the mass storage device. A user cannot effectively get content off the server without the keys. Accordingly, embodiments of the present invention advantageously facilitate convenient and secure distribution of proprietary content.

BRIEF DESCRIPTION OF THE DRAWINGS

Embodiments of the present invention are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Figure 1:
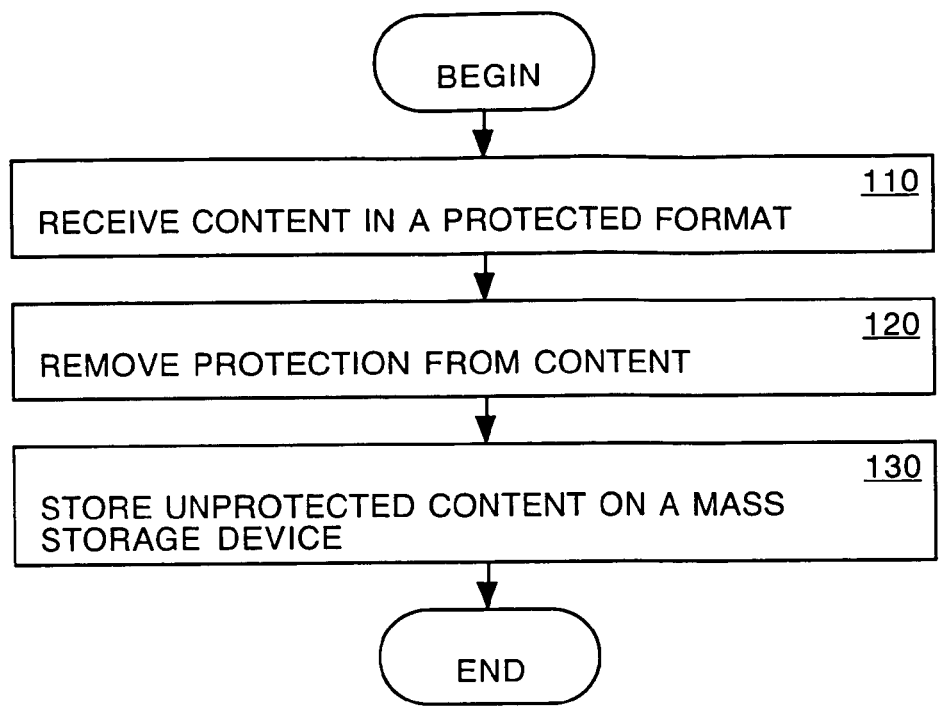
FIG. 1 shows a flow diagram of steps of a method of storing content on a content server according to the conventional art.
Figure 2:
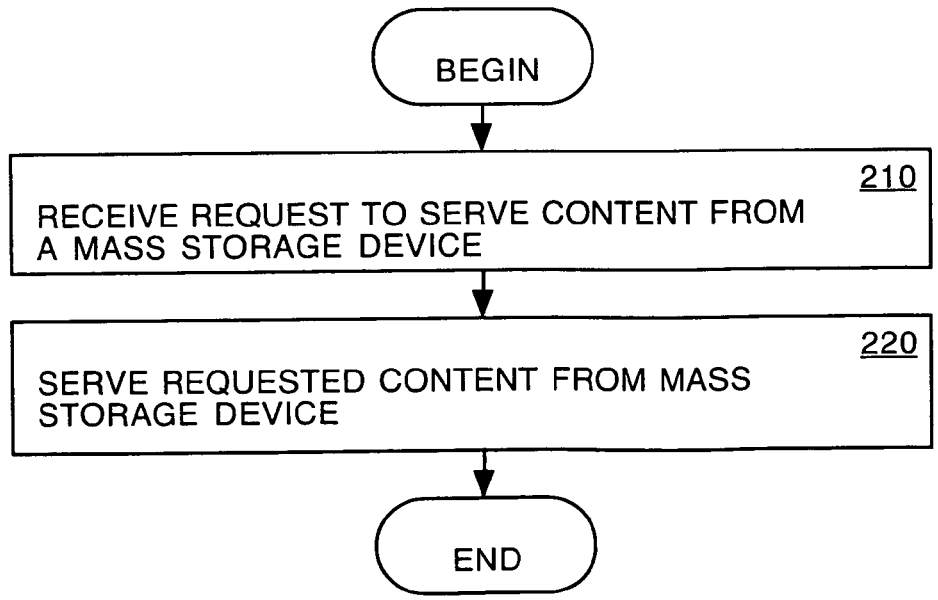
FIG. 2 shows a flow diagram of steps of a method of presenting content stored on the content server according to the conventional art.
Figure 3:
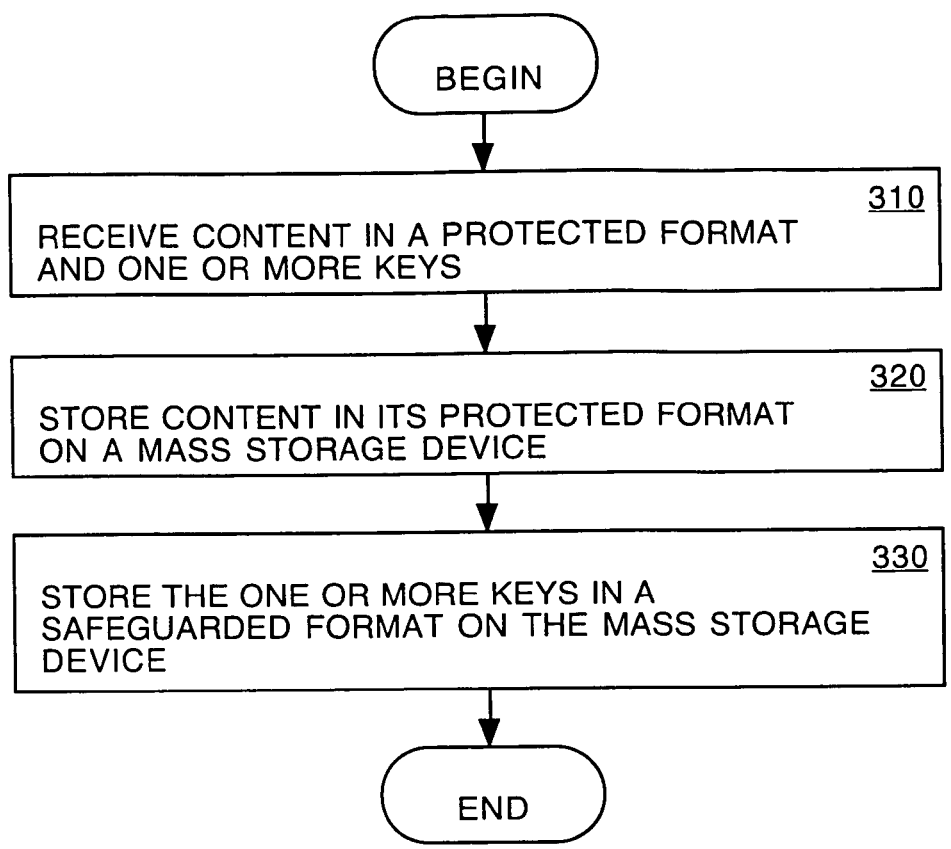
FIG. 3 shows a flow diagram of steps of a method of storing content, in accordance with one embodiment of the present invention.

Referring now to FIG. 3, a flow diagram of steps of a method of storing content, in accordance with one embodiment of the present invention, is shown. Content, as used hereinafter, may include digital information such as text, graphics, audio, sound, images, video, movies, music, applications, games and/or the like. As depicted in FIG. 3, the method begins with receiving content and one or more keys, at 310. The content may be received in a protected format or an unprotected format. In one implementation, protected content may be received in an encrypted format, such as content scrambling system (CSS) encryption or the like. In one implementation, the content may be received on a physical medium such as a compact disk (CD), digital versatile disk (DVD), memory card or the like.

The particular instance of the physical medium, from which a particular item of content was loaded onto the server from, is referred herein as the "original physical medium." In another implementation, the content may be received by any well-known signaling method such as electromagnetic, electrical, optical or the like (e.g., electronic transmission). Receiving content utilizing electronic transmission may enable content-on-demand, receiving new releases via a background download, and the like, without the user having to acquire the physical medium first.

In one implementation, a first key may be present on the physical medium (e.g., DVD, CD, flash memory card, etc.) containing the content and uniquely identifies the instance of the item of content. For example, the first key may be a disk key that uniquely identifies the content contained on the disk. The first key may alternatively be included with the transmitted content or the like and uniquely identifies the instance of the item of content. The keys may also include a second key that is dynamically generated by the content input device utilized for receiving the content. The second key may be unique to each transaction on the content input device. For example the second key may be a bus key provided by the media player (e.g., DVD drive, CD drive, card reader, etc.), transceiver (e.g., communication port, network interface card, etc.) or the like. A unique serialized key, which is generated each time the rip mechanism is executed, may also be utilized to provide portability.

At 320, the content may be stored on a mass storage device (e.g., hard disk drive). If the content is in a protected format, it is stored in its protected format. In one implementation, the received CSS encrypted content is copied to the mass storage device. Accordingly, it is appreciated that the particular protection mechanism of the proprietary content is maintained. At 330, the one or more keys associated with the content may be encoded in a safeguarded format and stored on the mass storage device. The keys may be encoded utilizing any well-known encryption algorithm. In one implementation, the disk key and the bus key may each be encrypted and hidden on the mass storage device.

It is appreciated that the mass storage device may also contain preloaded encrypted content. One or more encrypted keys related to the preloaded content may also be hidden on the mass storage device. Alternatively, the keys may be purchased and "downloaded" later from a remote "key server" or registry using some kind of 2-way network, such as Internet, satellite with a backchannel (e.g., DirecTV connected to a phone line so that one may order on-demand movies through the regular phone network), cellular or the like.

It is appreciated that a user interface (e.g., graphical user interface) may be provided to readily enable a user to load content onto the mass storage device in accordance with the above described processes. The user interface may also enable a user to purchase or rent content that is being loaded onto the mass storage device. The interface may also enable purchase of rental content that has previously been loaded onto the mass storage device or payment for an extension of the rental period. The interface may also enable purchase or rental of content that has been preloaded onto the mass storage device. The user interface may also enable purchase of credits to be applied to accessing any one or more items of content on the mass storage device as and when the user chooses. A transaction system may also be implemented by the user interface to enable the above-described transactions.

It is appreciated that one or more keys may contain a field that identifies the type of content, such as purchased content, rented content, preloaded content, offered content (e.g. for rent or for sale) or the like. The identifier of the type of content contained in a key may be utilized for such functions as purchasing the rented content, extending the rental period of rented content, renting or purchasing preloaded content, renting or purchasing offered content, and/or the like.

Furthermore, it is appreciated that the protection scheme of the original form of the content is substantially preserved. Accordingly, the stored content may be thought of as a virtual copy of the content. The one or more keys needed for playing the content are not accessible. Therefore, the method of storing content on a server, in accordance with the present invention, advantageously prevents extraction of the content back off the mass storage device, because the content remains encrypted and it is useless without the hidden encrypted keys. Thus, a user cannot effectively get such content off the server (e.g., play the content) without the decryption keys.

Figure 4:
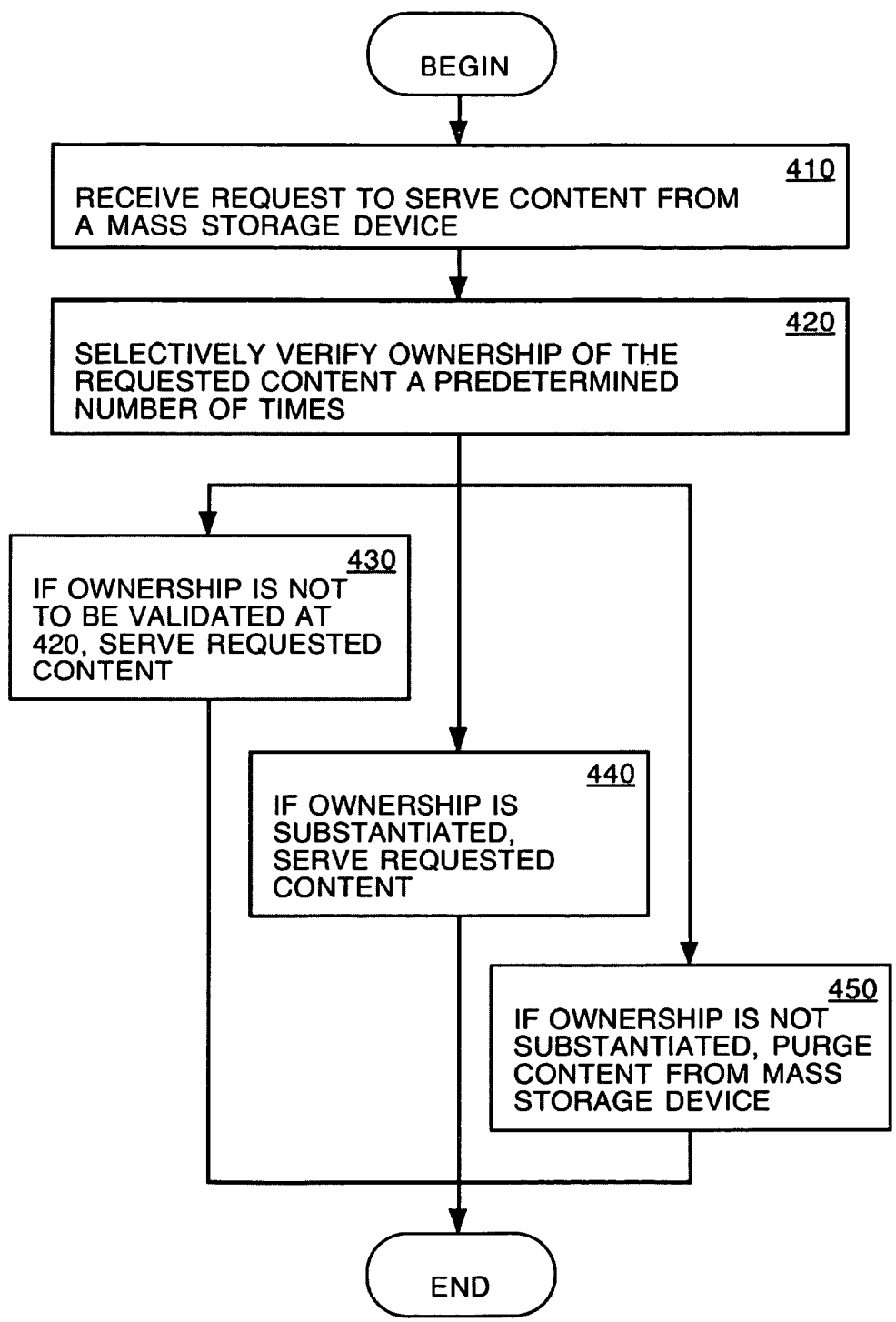
FIG. 4 shows a flow diagram of steps of a method of serving content, in accordance with one embodiment of the present invention.

Referring now to FIG. 4, a flow diagram of steps of a method of serving content, in accordance with one embodiment of the present invention, is shown. As depicted in FIG. 4, the method begins with receiving a request to serve one or more particular items of content, at 410. The request may be to play an item of content (e.g., movie, music, video game, etc.) saved on the mass storage device. In one implementation a user interface (e.g., graphical user interface) may be provided to enable a user to select a particular item of content stored on the mass storage device.

It is appreciated that the user interface (UI) may provide a drill-down type menu for selecting content stored on the mass storage device. For example, a first level may present various choices of content types, such as movies on the server, music on the server, television, internet, and/or the like. A second level may present categorical choices of content on the server, such as comedy, drama, actor, director, suggestion and/or the like. A third level may present a grid of thumbnails, wherein each thumbnail corresponds to a particular item of content on the server for a selected category.

It is appreciated that each item of content may be represented by a thumbnail or as a combination of text and a corresponding thumbnail. The thumbnail may be, for example, a still picture of an album cover for music, a still picture of a DVD jacket, a still picture of a scene from the movie, or the like. In addition, the thumbnail may be a video preview of a movie or may be a still picture of a scene and when the user causes a pointer to pass over the thumbnail or highlights the thumbnail a video preview may play. The thumbnail for use in the UI may be contained as part of the content when it is loaded on the system.

It is appreciated that a particular menu level, composed of a grid of thumbnails, may be dynamically scaled as a function of the view size of the display screen. The grid of thumbnails for a menu level may constitute a virtual display. Only a portion of the virtual display may actually be displayed on the physical screen. The virtual display may then be navigated such that a given portion is displayed on the physical screen.

It is appreciated that the system, via the user interface, may collect a history of content viewed by a user and suggest content based upon the past viewing history. The history may be collected on a per viewer basis. The suggestions may be present as a function of a hierarchy based upon the current viewers and/or the relative ranking of their individual and/or collective past viewing history.

At 420, ownership of the requested particular content may be selectively verified. The ownership of the content may be verified by requesting that the user provide evidence of ownership. In one implementation, ownership may be verified by requesting that the original physical medium (e.g., DVD, CD, memory card, etc.) be reinserted into the content input device. The keys on the reinserted medium may be compared to the encrypted keys hidden on the mass storage device. In another implementation, verification of ownership may be implemented by checking a registration database. The registration database may enable association of content with a given user or device upon proof-of-purchase, such as a unique serial number received by the user and/or device when the content has been purchased or rented. The registration database may thus provide authentication that the content as identified by the disk key has been registered for access by the system as identified by the bus key.

Ownership may be selectively verified a predetermined number of times. In one implementation, each verification request may be made after a fixed period of time (e.g., days, weeks, months, etc.). In another implementation, each verification request may be made after a random period of time. In another implementation, each verification request may be made after a random number of requests for the particular content. In one implementation, the predetermined number of times may be a fixed number of times for each item of content. In another implementation, the predetermined number of times may be a random number of times for each item of content. One or more of the above implementations may also be combined.

It is appreciated that one or more keys may contain a field that identifies the type of content, such as purchased content, rented content, preloaded content, offered content (e.g. for rent or for sale) or the like. The identifier of the type of content contained in a key may be utilized to adjust the selective verification of ownership in accordance with the nature of the content type.

It is appreciated that a registry, such as an interne based registration service, may be utilized to enable activation of content on one or more devices or transfer of content from one user to another. The registry (e.g., database) may associate instances of a particular item of content (e.g., disk key) with a particular owner (e.g., user ID, device ID). For example, a user may have the content on a plurality of systems, such as a home content server and a vacation home server system. In such case, the registry may be utilized to enable access to the content on only one system at a time by limiting association of the disk key with a select number of device identifiers. In another implementation, the registry enables an owner of a particular instance of content to sell it to another person. The transaction may be based upon a unique serialized key stored on the mass storage device and contained in the registry. In yet another implementation, the registry may enable the content to be streamed (e.g., served) to a portable device, such as a phone, laptop computer or the like, at any number of locations across any network (e.g., virtual player).

At 430, if ownership of the content is not to be validated at 420 for the given request, the requested content may be decrypted and presented. At 440, if ownership of the particular content is substantiated, the requested content may be decrypted and presented. At 450, if ownership of the particular content is not substantiated, the request may be denied. Furthermore, if ownership of the particular content is not substantiated, the requested content may also be purged or otherwise rendered unselectable, an error message may be generated, a transaction system may be invoked, or the like.

Typically, process 420 may be repeated for each of a predetermined number of times with regard to requests for each given item of content. If ownership of the particular content is substantiated each of a predetermined number of times, the ownership may be considered corroborated. If ownership of the particular content is corroborated, ownership may not need to be validated again. Thereafter, a request for content, wherein ownership has been corroborated, may be served to the user, at 430, without further validation processes.

In an exemplary implementation, a first verification request may be made a random one of a number of plays after a first fixed period of time. The first fixed period of time may be measured from when the particular content was loaded onto the system. The first fixed period of time may be selected based upon a criterion such as the typical rental period (e.g., 10 days). A second verification request may be made a random one of number of plays after the expiration of a second fixed period. The second fixed period of time (e.g., 30 days) may be greater than the first fixed period of time, to reduce the inconvenience factor to the user. A third and final verification request may be made a random one of a number of plays after the expiration of a third fixed period. The third fixed period of time (e.g., 100 days) may be greater than the second fixed period of time, to further reduce the inconvenience factor to the user. Thereafter, the system will have been "taught" that ownership has been corroborated and subsequent requests for the same content can be served without verifying ownership.

Accordingly, the method balances convenience for the user with the economic interests of the content creator and/or distributor. For example, if the content is a rented DVD, the user may load the movie on the system and view it any number of time during the ten day period of the rental without having to reinsert the DVD each time. After the rental period, the user will have returned the DVD. Thus, if the user attempts to continue watching the movie, the system will eventually request reinsertion of the DVD. However, ownership will not be substantiated because the rental DVD has been returned and thus the user will be unable to reinsert it. If ownership is not substantiated the system may purge the content.

If the content has been purchased by the user and loaded on the system, the user will have possession of the DVD. Therefore, when requested at each of the random number of plays during three increasing periods of time, the user will be able to substantiate ownership by reinserting the DVD. It can be inferred that there is a substantial likelihood that the user owns the content from the fact that the user was able to provide the original physical medium containing the content each time. The user, on the other hand, does not have to in most cases insert the DVD when they want to watch the movie.

If the content has been borrowed, the user may be able to watch it for a short period of time. However, at some point in time the user will likely have returned the DVD to the actual owner. Thus, because the user cannot reliable predict when they are going to be requested to reinsert the DVD, the system will likely be able to determine that the content is not owned by the user of the system and therefore purge it.

Accordingly, embodiments of the present invention advantageously balance user convenience and the economic interests of content creators and/or distributors. Ownership of requested content can be selectively verified before the requested content is presented. If ownership is not substantiated, the content may be purged from the system. Furthermore, if ownership is successfully substantiated a number of times, the system may be taught that the content is owned and verification need not be performed again.

Figure 5:
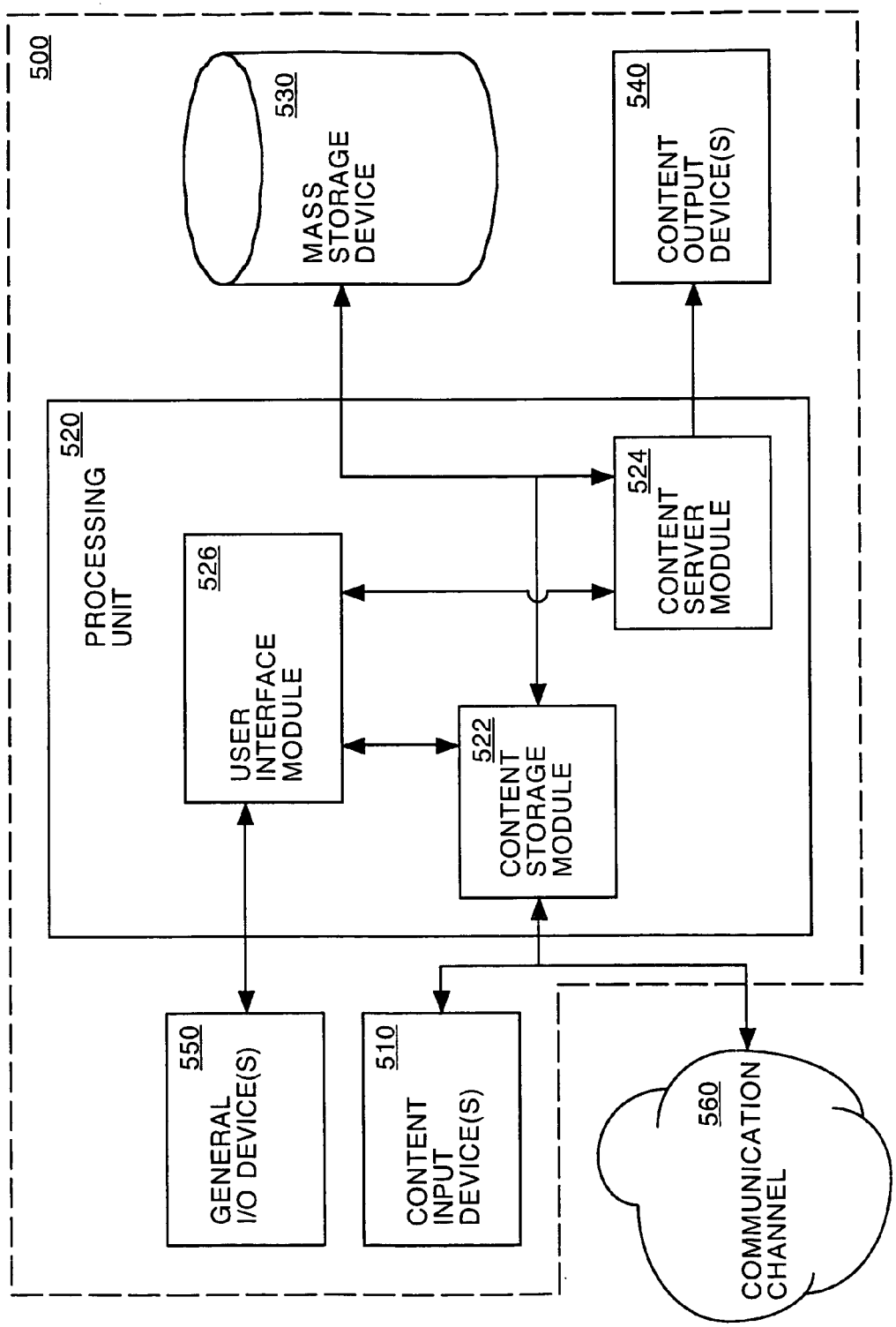
FIG. 5 shows a block diagram of a system for storing and serving content, in accordance with one embodiment of the present invention.

Referring now to FIG. 5, a block diagram of a system for storing and serving content, in accordance with one embodiment of the present invention, is shown. The system 500 may be implemented on a personal computer, a server, a client, a laptop computer, a media center PC, a personal entertainment center, a set top box, a game console, a personal digital assistant, a cellular telephone, a portable wireless appliance, and/or the like. As depicted in FIG. 5, the system includes one or more content input devices 510, a processing unit 520, a mass storage device 530 (e.g., computer readable medium) and one or more content output devices 540. The system 500 may also include one or more general input/output devices 550. It is appreciated that the content input devices 510 and content output devices 540 may be particular units of the general input/output devices 550. The system 500 may also be communicatively coupled to a communication channel 560, for receiving content utilizing any well-known signaling method.

The processing unit 520 may be communicatively coupled to the general I/O device 550, the content input device 510, the mass storage device 530 and the content output device 540. The content input device 510 may be a compact disk (CD) drive, a digital versatile disk (DVD) drive, a memory card reader and/or the like. The content output device 540 may be a display, monitor, television, projector, speaker, headphone, brail reader and/or the like. The mass storage device 530 may be a hard disk drive (HDD), portable storage device/card (e.g., USB drive and other flash-based memory) or the like. The general I/O devices 550 may be a keyboard, pointing device, monitor, speaker, brail reader and/or the like.

The processing unit 520 provides one or more function modules by operating on instructions (e.g., computer executable code) and information (e.g., data) stored in memory (e.g., computer-readable medium). The function modules may include a content storage module 522, a content server module 524 and a user interface module 526. The content storage module 522 may receive content via the content input device 510 or the communication channel 560 (e.g., network). The content may be received in a protected or unprotected format. The user interface module 526 may enable a user to cause the content storage module 522 to load the content onto the mass storage device 530.

If the content is received in a protected format, the content storage module 522 may also receive one or more keys. The keys may include a first key unique to the content and a second key may be dynamically generated by the content input device 510. The content storage module 522 may store the content in its protected format and the one or more keys in a safeguarded format on the mass storage device 530.

The content server module 524 may receive a request for a particular item of content stored on the mass storage device 530 via the user interface module 526. The content server module 524 may selectively verify ownership of the requested content utilizing the one or more keys corresponding to the requested content, which are stored on the mass storage device 530. If ownership of the content is validated, the content server module 524 outputs the requested content on the content output device 540 utilizing the one or more keys corresponding to the content, which are stored on the mass storage device 530. If ownership of the content is not validated, the content server module 524 may purge the particular content from the mass storage device.

Accordingly, embodiments of the present invention advantageously prevent extraction of server stored content back off the mass storage device. Embodiments of the present invention advantageously balance user convenience and the economic interests of content creators and/or distributors. Embodiments of the present invention thus advantageously facilitate convenient and secure distribution of proprietary content.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A non-transitory computer-readable medium containing plurality of instructions which when executed cause a system to implement a method of storing content comprising:
   receiving, at said system, an instance of an item of content;
   receiving, at said system, a first key and a second key corresponding to said item of content, wherein said first key uniquely identifies said instance of said item of content, is used, at said system, to verify ownership of said instance of said item of content and is used, at said system, to unprotect said instance of said item of content, and wherein said second key is unique to said system;
   storing said item of content in a protected format of an original form of said item of content and not another format on a mass storage device of said system, when said content is in said protected format; and
   storing said first key and said second key in a safeguarded format on said mass storage device, when said content is in said protected format.

2. The non-transitory computer-readable medium according to claim 1, wherein said item of content is digital information and is selected from the group consisting of text, graphics, audio, sound, image, video, movie, music, application, and game.

3. The non-transitory computer-readable medium according to claim 1, wherein said protected format comprises a content scrambling system encrypted format.

4. The non-transitory computer-readable medium according to claim 3, wherein said second key is dynamically generated in response to said receiving said item of content.

5. The non-transitory computer-readable medium according to claim 4, wherein said safeguarded format results from:
   encrypting said first key and said second key; and
   hiding said encrypted first key and said second key on said mass storage device.

6. The non-transitory computer-readable medium according to claim 5, wherein receiving said instance of said item of content comprises receiving said instance of said item of content from a physical medium.

7. The non-transitory computer-readable medium according to claim 5, wherein receiving said instance of said item of content comprises receiving said item of content across a communication channel.

8. The non-transitory computer-readable medium according to claim 5, wherein receiving said instance of said item of content comprises receiving a signal encoding said instance of said item of content.

9. A system for storing, content comprising:
a content input device;
a mass storage device; and
a processing unit communicatively coupled to said content input device and said mass storage device, wherein said processing unit comprises a content storage module for receiving an instance of an item of content in a encrypted format of an original physical medium from said content input device, for receiving a first key and a second key corresponding to said instance of said item of content, for storing said instance of said item of content in said protected format and not another format on said mass storage device and for storing said first key and said second key in a safeguarded format on said mass storage device, wherein said first key uniquely identifies said instance of said item of content, is used, at said system, to verify ownership of said instance of said item of content and is used, at said system, to decrypt said instance of said item of content, and said second key is unique to said receiving said instance of said item of content on said content input device.

10. The system of claim 9, wherein said mass storage device comprises a preloaded instance of an item of content and a third key that uniquely identifies said preloaded instance of said item of content.

11. The system of claim 9, wherein said content input device receives a physical medium containing instance of said item of content and said first key.

12. The system of claim 11, wherein said content input device dynamically generates said second key unique to said receiving said physical medium on said content input device.

13. The system of claim 9, wherein said first key comprises a field for identifying a content type selected from a group consisting of purchased content, rented content, preloaded content and offered content.

14. The system of claim 9, wherein said safeguarded format comprises an encrypted format.

15. The system of claim 9, wherein said protected format comprises a content scrambling system encrypted format.

16. The system of claim 9, wherein said first key is a disk key.

17. The system of claim 9, wherein said second key is a bus key.

18. The system of claim 9, wherein said content input device comprises one or more devices selected from the group consisting of a compact disk drive, a digital versatile disk drive, a memory card reader, a communication port and a network interface card.

19. The system of claim 9, wherein said mass storage drive comprises a disk drive.

20. The system of claim 9, wherein said content storage module further receives an instance of an other item of content in a protected format from a communication channel, receives a third key and a fourth key corresponding to said other item of content, stores said other item of content in said protected format on said mass storage device and stores said third key and said fourth key in a safeguarded format on said mass storage device, wherein said third key uniquely identities said instance of said other item of content and said fourth key is unique to receiving said instance of said other item of content by content storage module.

* * * * *